United States Patent [19]

Squicciarini

[11] Patent Number: 4,535,198
[45] Date of Patent: Aug. 13, 1985

[54] DIGITAL TERMINAL KEYBOARD DIALING

[75] Inventor: Gaetano N. Squicciarini, Freehold Township, Monmouth County, N.J.

[73] Assignee: AT&T Information Systems Inc., Holmdel, N.J.

[21] Appl. No.: 514,882

[22] Filed: Jul. 18, 1983

[51] Int. Cl.³ .......................................... H04M 11/00
[52] U.S. Cl. .................................................. 179/2 DP
[58] Field of Search ................... 179/2 DP, 2 A, 2 R, 179/99 M; 370/42, 53

[56] References Cited

U.S. PATENT DOCUMENTS 4,112,258  9/1978  Alles .
4,479,123 10/1984  Loskorn et al. ............. 179/2 DP X

OTHER PUBLICATIONS

Accarino et al., "Frame-Mode Customer Access to Local Integrated Voice and Data Digital Networks," Report: 1979 IEEE International Conference on Communications, pp. 38.5.1-38.5.7.
Soames et al., "HERALD-A Business Telephone Communication System for the 1980s", Report: Conference on Communications Equipment & Systems, Birmingham, England, Apr. 16-18, 1980, pp. 155-159.
Divakaruni et al., "Dimension PBX: Advances for Today, Transitions for Tomorrow", Bell Laboratories Record, vol. 60, No. 9, Nov. 1982, pp. 254-259.

Primary Examiner—Keith E. George
Attorney, Agent, or Firm—James M. Graziano

[57] ABSTRACT

The digital terminal keyboard dialing arrangement of this invention enables a user to originate data calls directly from any digital terminal keyboard without requiring the use of an associated telephone station set. In particular, the subject telephone switching system has a control signalling channel between the digital terminals and the system processor. This control signalling channel is used to convey the ASCII output from the digital terminal keyboard directly to the system processor on a call origination. Upon call completion, the ASCII output from the digital terminal keyboard is routed to the called party via the switching network.

8 Claims, 7 Drawing Figures

DIGITAL TERMINAL KEYBOARD DIALING

CROSS-REFERENCE TO RELATED APPLICATIONS

This application is related to the following concurrently filed applications:

J. H. Zink 1, Ser. No. 514,519, entitled "Data Call Transfer";

and J. H. Zink 2, Ser. No. 514,518, entitled "Data Call Transfer Preindication".

FIELD OF THE INVENTION

This invention relates to telephone switching systems and, in particular, to an arrangement for originating data calls directly from a digital terminal by using the terminal keyboard.

DESCRIPTION OF PRIOR ART

Telephone switching systems connect to digital terminals by using either special digital port circuits or modems which interface the digital terminal to any analog port circuit. In either case, a standard telephone station set must be used to originate a data call for the digital terminal. This telephone station set is bridged on to the communication pair associated with the digital terminal and is used to implement the off-hook and digit dialing functions. Once the data call has been originated in this fashion, the telephone station set is returned to the on-hook condition and remains unused for the remainder of the data call. This arrangement is an inefficient use of the telephone station set.

Some telephone switching systems provide digital terminals which can originate data calls directly but on close inspection it is obvious that the telephone station set is simply incorporated into the digital terminal. This arrangement provides no benefit to the user other than reducing the number of separate devices needed to provide the service.

DESCRIPTION OF THE INVENTION

The digital terminal keyboard dialing arrangement of this invention enables a user to originate data calls directly from the keyboard of any digital terminal without requiring the use of an associated telephone station set or a Touch-Tone signalling pad built into the digital terminal. This is accomplished on a call origination by routing the ASCII signals output by the digital terminal keyboard to the system processor when the user types the called party identification on the keyboard. These ASCII signals, which identify the called party, are used by the system processor to establish a switching network connection between calling and called parties.

In particular, the subject telephone switching system has a control signalling channel between the digital terminals and the system processor, and a voice signalling channel between the digital terminals and the switching network. On a call origination with digital terminal keyboard dialing, the initial output from the digital terminal keyboard is a set of ASCII signals which represent the identification of the call destination (the called station). The control signalling channel transmits this set of ASCII signals from the digital terminal keyboard directly to the system processor on a call origination. Once this "dialing" is completed, the system processor uses the stored set of ASCII signals to activate the switching network to connect the calling digital terminal to the called station. The subsequent ASCII output of the digital terminal keyboard is then routed over the voice signalling channel to the switching network which conveys these ASCII signals to the called station.

Thus, the user need not equip each communication pair serving a digital terminal with a telephone station set since the user can originate data calls directly from the digital terminal keyboard. This digital terminal keyboard dialing is accomplished by switchably connecting the ASCII output of the digital terminal keyboard to the control signalling channel while the user is originating a call, and then over the voice signalling channel to the switching network when the telephone switching system completes the call connection.

DETAILED DESCRIPTION OF THE DRAWINGS

Figures 1, 7:
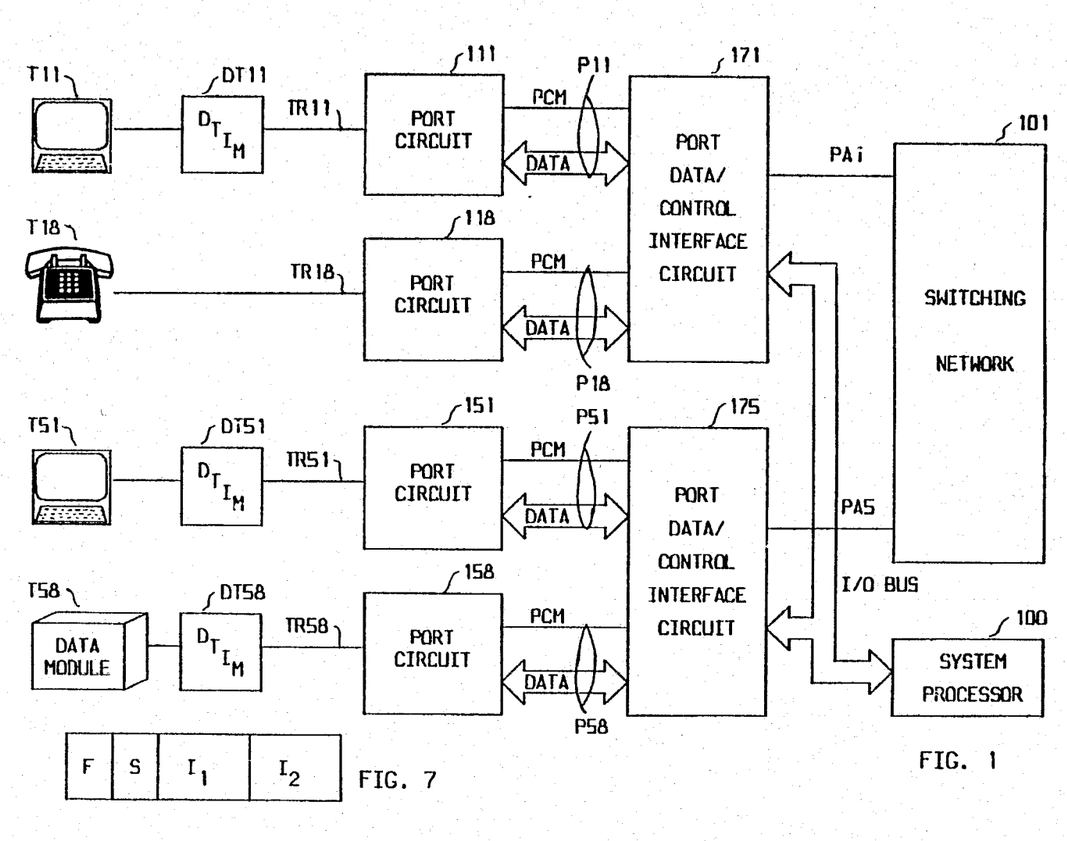
FIG. 1 illustrates the subject telephone switching system in block diagram form.
FIG. 7 illustrates the data transmission format used between digital terminals and port circuits.

The subject telephone switching system is illustrated in block diagram form in FIG. 1. This system is described in detail in copending application Ser. No. 417,504, filed Sept. 13, 1982 by J. A. Lucas. This system includes a plurality of communications circuits T11-T58 each of which is associated with a respective one of port circuits 111-158. These communications circuits may include digital telephone station sets (T18) as well as digital terminal devices (T11) which are equipped with a keyboard and a CRT. A port circuit (such as 111 of FIG. 1) interfaces between alternate bipolar modulated code messages used by communications circuits T11-T58 and either pulse code modulated (PCM) data or PCM-encoded voice signals transmitted by switching network 101 between the calling and called communications circuits. Port circuit 111 forwards control messages between system processor 100 via port/data control interface circuit 171 and digital terminal device T11.

Switching network 101 comprises a time slot interchange circuit of the type illustrated in U.S. Pat. No. 4,112,258. Switching network 101 is connected to a number of port data/control interface circuits 171-175, each of which serves as a multiplexor for a plurality of port circuits 111-158 and their associated communications circuits (T11-T58). Thus, switching network 101 establishes communication connections among port circuits 111-158 via the associated port data/control interface circuits 171-175.

This switching system is equipped with a control signalling channel (S channel) which conveys control messages between system processor 100 and communications circuits T11-T58. The S channel extends from each communication circuit (Such as T11) through associated digital terminal interface module (DTIM) DT11, communication leads TR11, port circuit 111, leads P11 and then through port data/control interface circuit 171 to system processor 100 via I/O BUS. The switching system is also equipped with an information channel (I channel) which conveys information data such as PCM-encoded voice signals or bulk data between switching network 101 and communications circuits T11-T58. The I channel extends from each communications circuit (such as T11) through associated DTIM DT11, communication leads TR11, port circuit 111, leads P11 and then through port data/control interface circuit 171 to switching network 101 via leads PA1.

I CHANNEL REALIZATION

System processor 100, in the course of connecting calling digital terminal T11 to a called digital terminal such as data module T58, assigns a time slot in switching network 101 for the interconnection of digital terminals T11 and T58. Switching network 101 controls the data or I channel transmissions from communications circuits T11-T58. In particular, switching network 101 transmits each eight bit byte of data received from data module T58 to port circuit 111 via port data/control interface circuit 171. Port circuit 111 transmits each byte of data so received to digital terminal T11 via DTIM DT11 and also receives a reply byte of data from digital terminal T11 via DTIM DT11 for transmission to digital terminal T58. Port circuit 111 transmits the reply byte of data received from DTIM DT11 to switching network 101 via port data/control interface circuit 171. Switching network 101 stores the received byte of data, and interchanges the data bytes received from digital terminal T11 and digital terminal T58 during the time slot assigned for this call. This action interconnects these digital terminals.

S CHANNEL REALIZATION

The control or S channel transmissions are controlled by system processor 100. System processor 100 periodically scans each port, trunk and service circuit connected to switching network 101 to find if there is a control message for system processor 100. During each such scan cycle, system processor 100 transmits timing, address and control information to port data/control interface circuits 171-175 via I/O BUS. Each port data/control interface circuit (ex. 171) is a multiplexer which interprets the signals received on I/O BUS during each scan cycle and determines whether the address signals transmitted thereon identify one of the port circuits (e.g. 111) served by that port data/control interface circuit (171). If such a match occurs during a scan cycle, port data/control interface circuit 171 enables the identified port circuit 111 to read the control message transmitted to port data/control interface circuit 171 by system processor 100.

Port circuit 111 reads the control message written into port/data control interface circuit 171 by system processor 100 and places the control message into a control message register (not shown) in port circuit 111. Port circuit 111 transmits this control message one bit at a time from the control message register to DTIM DT11. DTIM DT11 assembles these serial bits into commands for digital terminal T11. Digital terminal T11 responds to these commands by performing the indicated operation, such as lighting a lamp, producing an audible ring signal, etc.

If digital terminal T11 has no reply or other control message to send back to system processor 100, DTIM DT11 transmits idle bits back to port circuit 111. If digital terminal T11 has a control message to send to system processor 100, it is written into the control message register of port circuit 111 one bit at a time. Port circuit 111 sets a data-ready bit in its status register (not shown) to indicate to system processor 100 that a control message has arrived from digital terminal T11. System processor 100 periodically scans the port circuit status registers via I/O BUS and port data/control circuit 171 for a set data-ready bit. When one is found, system processor 100 reads the control message stored in the control message register of port circuit 111 and resets the data-ready bit in the status register.

ASCII DIALING

In this system, a user can originate a call directly from a digital terminal by using the terminal keyboard. From the time that the calling digital terminal T11 is turned on by a user to the time a switching network connection is established by switching network 101 between calling and called digital terminals (T11 and T58), the telephone switching system treats the ASCII signals output by calling digital terminal T11 as a series of control messages for system processor 100. On a call origination, the calling party "dials" the identifier (station number) of the called digital terminal by operating the corresponding keys on the keyboard of digital terminal T11. The ASCII signals so generated are routed to system processor 100 as control messages by way of the control signalling (S) channel (via DTIM DT11, port circuit 111, port data/control interface circuit 171, I/O BUS). System processor 100 uses these ASCII signals to establish a communication path through switching network 101 from calling digital terminal T11 to called digital terminal T58. Once this communication path is established, the ASCII signals subsequently output by the keyboard of digital terminal T11 are routed to switching network 101 via the information (I) channel and then to called digital terminal T58.

The selective routing of the ASCII signals output by the digital terminal keyboard to either the S or I channels is accomplished by an associated digital terminal interface module. This device also enables the digital terminal to be located remotely from the telephone switching system.

The standard digital terminal keyboard has an RS232 signal output which has a very limited transmission range. A digital terminal interface module is used to convert the RS232 signals to alternate bipolar modulated code signals which can be transmitted a significant distance over a communication pair to the telephone switching system. The digital terminal interface module is either an integral part of the digital terminal (the situation assumed for this disclosure) or connected between the existing digital terminal and the associated communication pair.

MESSAGE FORMAT—FIG. 7

A particular message frame format is used by DTIM of FIG. 1 to enable data transmission between port circuits such as 111 and their associated digital terminals such as T11. This format consists of a framing bit and three fields: an S field that conveys control signalling data, and two I fields that convey information data (FIG. 7). This is a well-known data transmission format as described in the article by N. Accarino et al entitled, "Frame-Mode Customer Access to Local Integrated Voice and Data Digital Networks" published in 1979 in the Conference Report of the IEEE 1979 International Conference on Communications. In this data transmission format, one of the I fields can be used for the transmission of PCM-encoded voice information while the other one (or both I fields) can be used for the transmission of either bulk or interactive data.

DIGITAL TERMINAL INTERFACE MODULE (DTIM)—FIG. 2

Digital terminal interface module (DTIM) DT11 (200) (illustrated in FIG. 2) is a microprocessor controlled circuit which contains a number of interface and protocol conversion devices. Digital terminal T11 generates EIA control, ASCII data and timing signals that are converted by EIA interface circuit 201 from RS232 signal levels to 5 volt logic signal levels. EIA interface 201 includes line driver 210 and line receiver 211 to handle signal transmitting and receiving over the signal leads which connect DTIM DT11 200 with digital terminal T11. Converter 212 provides control signal and data signal storage functions. In particular, converter 212 includes status registers to store an indication of the state of the various EIA control leads from digital terminal T11. Converter 212 also includes a FIFO which stores serial data bits transmitted by digital terminal T11 to EIA interface 201. When the FIFO in converter 212 contains eight bits, converter 212 sets a byte received flag in a byte received status register.

Figure 2:
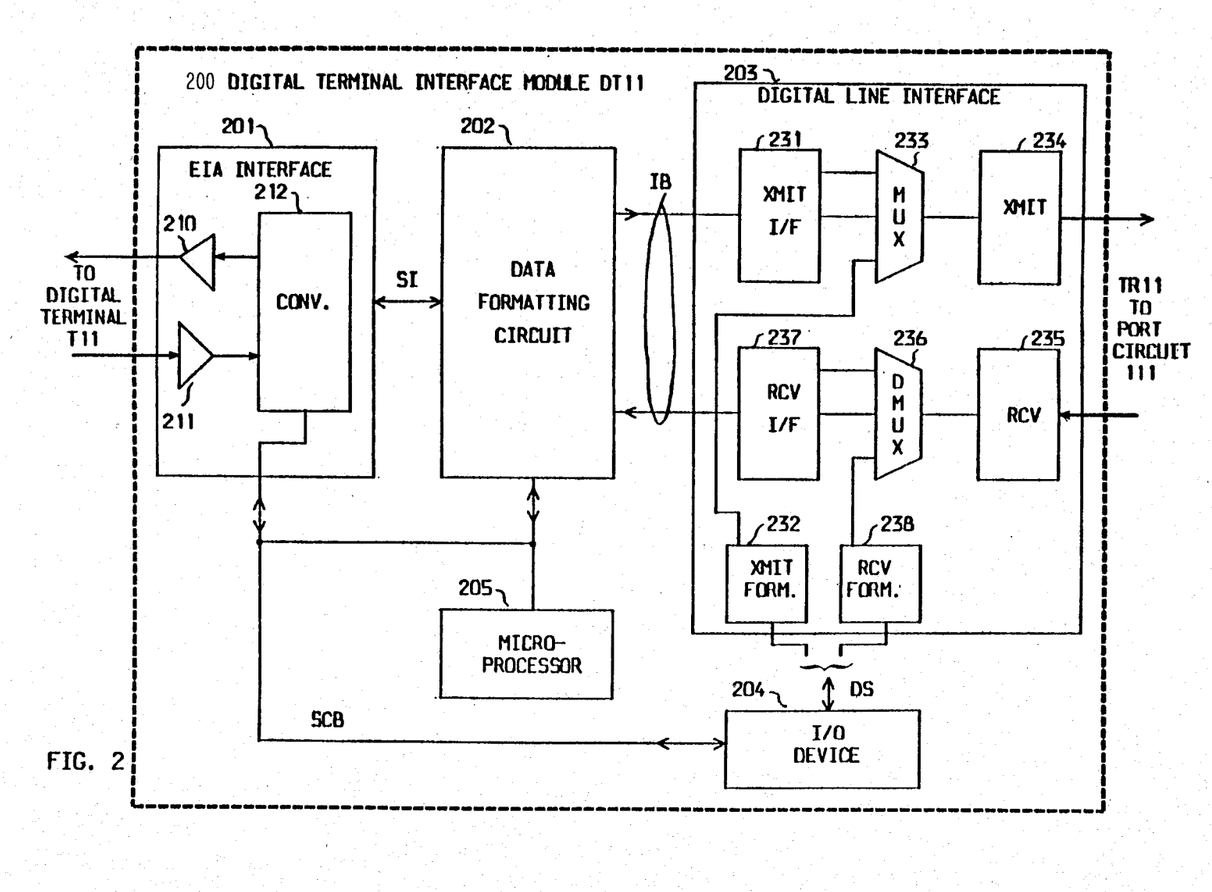
FIG. 2 illustrates the digital terminal interface module in block diagram form.

Microprocessor 205 periodically scans all the status registers in EIA interface 201 via bus SCB to determine whether there are any changes in the status of digital terminal T11. When a status register indicates a change in the state of an EIA control lead, microprocessor 205 reads the changed state out of the status register and generates a control message for system processor 100. Microprocessor 205 writes this control message via bus SCB into I/O device 204 which is an Intel 8243 I/O latch circuit. Similarly, when microprocessor 205 detects a set byte received flag during a scan of converter 212, it signals EIA interface 201 to output the received eight bit data byte in parallel over leads SI to data formatting circuit 202.

Data formatting circuit 202 generates idle flags when no data is being received from digital terminal T11. These idle flags are periodically read by digital line interface 203 and transmitted to switching network 101 via the I channel (port circuit 111, port data/control interface circuit 171). However, once digital terminal T11 begins transmitting a data message, data formatting circuit 202 formats the received data message and stores it in eight bit increments in a data message memory (not shown) in data formatting circuit 202.

Digital line interface 203 interconnects DTIM DT11 200 with port circuit 111 via communication leads TR11. Digital line interface 203 includes a control circuit (not shown) and a phase locked loop (not shown) which recover the clock signals from the message frames serially transmitted by port circuit 111 to DTIM DT11 200 via communication leads TR11. These recovered clock signals are used by digital line interface 203 to both receive message frames from port circuit 111 and generate message frames for serial transmission to port circuit 111.

Transmit interface 231 reads out two eight bit bytes ($I_1$ and $I_2$) at a time of the formatted data message from the data message memory of data formatting circuit 202. Similarly, transmit formatter 232 reads one bit (S) at a time of the control message stored by microprocessor 205 in I/O device 204. Multiplexer 233 combines the two eight bit data bytes ($I_1$ and $I_2$) from transmit interface 231 with the one bit (S) control message from transmit formatter 232 to create the message frame of FIG. 7. The resultant message frame is transmitted in serial form by transmitter 234 to port circuit 111 via communication leads TR11.

Message frames transmitted to DTIM DT11 200 by port circuit 111 are received and decoded in reciprocal fashion by DTIM DT11 200. Receiver 235 receives message frames serially transmitted by port circuit 111 on communication leads TR11. Demultiplexor 236 takes the received message frames from receiver 235 and applies the two eight bit data bytes ($I_1$ and $I_2$) to receive interface 237 and the one bit (S) of the control message to receive formatter 238. Receive formatter 238 stores the received control bit in I/O device 204 via lead DS. Microprocessor 205 reads the received control message from I/O device 204 in eight bit increments and interprets same. If the control message requires that digital terminal T11 be signalled, microprocessor 205 loads the status registers in EIA interface 201 so that the control message will be forwarded to digital terminal T11. Similarly, data formatter 202 reads the two eight bit data bytes from receive interface 237 and transmits same to digital terminal T11 via EIA interface 201. Data formatter 202 calculates a Cyclic Redundancy Checkword (CRC) code on the received data message to insure accuracy of transmission.

ASCII DIALED CALL

For purposes of illustration consider a call from digital terminal T11, having a keyboard and a CRT, to a data module (T58) within the same PBX. Assume that the calling party uses the keyboard of digital terminal T11 to input the extension number (or some alphanumeric identifier) of data module T58, and that called data module T58 is a computer port which is automatically answered.

The calling party originates this data call by turning on digital terminal T11 and depressing a predefined key (the "BREAK" key in this example) on the keyboard. DTIM DT11 200 (FIG. 2) interprets the combination of a "power on" condition and the "BREAK" keystroke from digital terminal T11 as calling for an "off-hook".

Microprocessor 205 periodically scans EIA interface circuit 201 to determine whether there has been a change in the status of associated digital terminal T11. The above-mentioned "power on" condition and "BREAK" keystroke are detected by EIA interface circuit 201 and stored therein as data bits in the status registers and FIFO respectively. Microprocessor 205 scans EIA interface 201 and detects the "power on" status stored in the status register. Microprocessor 205 is programmed to respond to a "power on" status change by reading the contents of the FIFO in EIA interface 201. The "BREAK" keystroke is stored in the FIFO and microprocessor 205 responds to this data by generating an "off-hook" control message to be sent to system processor 100. Microprocessor 205 also establishes a logical channel between EIA interface 201 and I/O device 204 to directly store all signals received from digital terminal T11 in I/O device 204 as S bit control messages for system processor 100.

This logical channel is realized by microprocessor 205 writing the "off-hook" control message and all subsequent control messages into I/O device 204. Digital line interface 203 periodically reads out the contents of both data formatting circuit 202 and I/O device 204 to generate message frames. Since no data messages are now being generated, the data message memory of data formatting circuit 202 contains only idle bits. Digital line interface 203 combines these idle bits with the "off-hook" control message stored in I/O device 204 to create a message frame for transmission to port circuit 111 as described above.

OFF-HOOK MESSAGE

The above-mentioned "off-hook" control message is transmitted as S bits in successive message frames as described from DTIM DT11 200 to system processor 100 via the S channel (port circuit 111, port data/control interface circuit 171, I/O BUS). System processor 100 recognizes the off-hook control message and responds by branching to a subroutine that collects dialed digits. As part of this digit collection procedure, system processor 100 returns the control text message "DIAL" in ASCII characters over the S channel to digital terminal T11 where the characters "DIAL" are displayed on the CRT to the calling party.

The text control message "DIAL" is transmitted by system processor 100 to port data/control interface circuit 171 via I/O BUS. As described above, port data/control interface circuit 171 switches the control message to port circuit 111 which transmits the control message one bit at a time to DTIM DT11 200 in the S field of successive message frames. Receiver 235, demultiplexer 236 and receive interface 237 take the received S bits and store them in I/O device 204. Microprocessor 205 reads out eight bits at a time of the received control message from I/O device 204 and stores the eight bits in the FIFO of EIA interface 201. Line driver 210 transmits the contents of the FIFO to digital terminal T11 which responds to the text control message by displaying same on the CRT.

Thus, entry of a "BREAK" keystroke causes the word "DIAL" to appear on the CRT of digital terminal T11. In response, the calling party performs a "dialing" function by typing the set of identifying characters to be dialed on the keyboard of digital terminal T11. In this example, the set of identifying characters is the station number of data module T58. Since a communication connection has not yet been established between digital terminal T11 and data module T58, the "dialed" ASCII characters are transmitted to system processor 100 via the S channel.

SYSTEM RESPONSE TO DIALING

FIGS. 3-6 are a state diagram of the process used by system processor 100 to collect the "dialed" ASCII characters from the keyboard of digital terminal T11. The process starts at step 302 where system processor 100 (designated on the state diagram as MP) receives the off-hook control message from digital terminal T11 via port data/control interface circuit 171 over the S channel. System processor 100 determines at decision 303 whether digital terminal T11 is restricted from ASCII dialing. This is done by reading the class of service assigned to digital terminal T11 from a class of service table maintained for that purpose in system processor 100. If digital terminal T11 is assigned a restricted class of service, system processor 100 proceeds to step 304 and returns an intercept call-progress control message to DTIM DT11 200 along with the ASCII test message "DENIED". The text message is displayed on the CRT screen of digital terminal T11, and the call-progress control message causes digital terminal T11 to disconnect. Port circuit 111 responds with an S channel on-hook control message at step 305 indicating that digital terminal T11 is disconnected and system processor 100 exits call processing at step 306.

Figure 3:
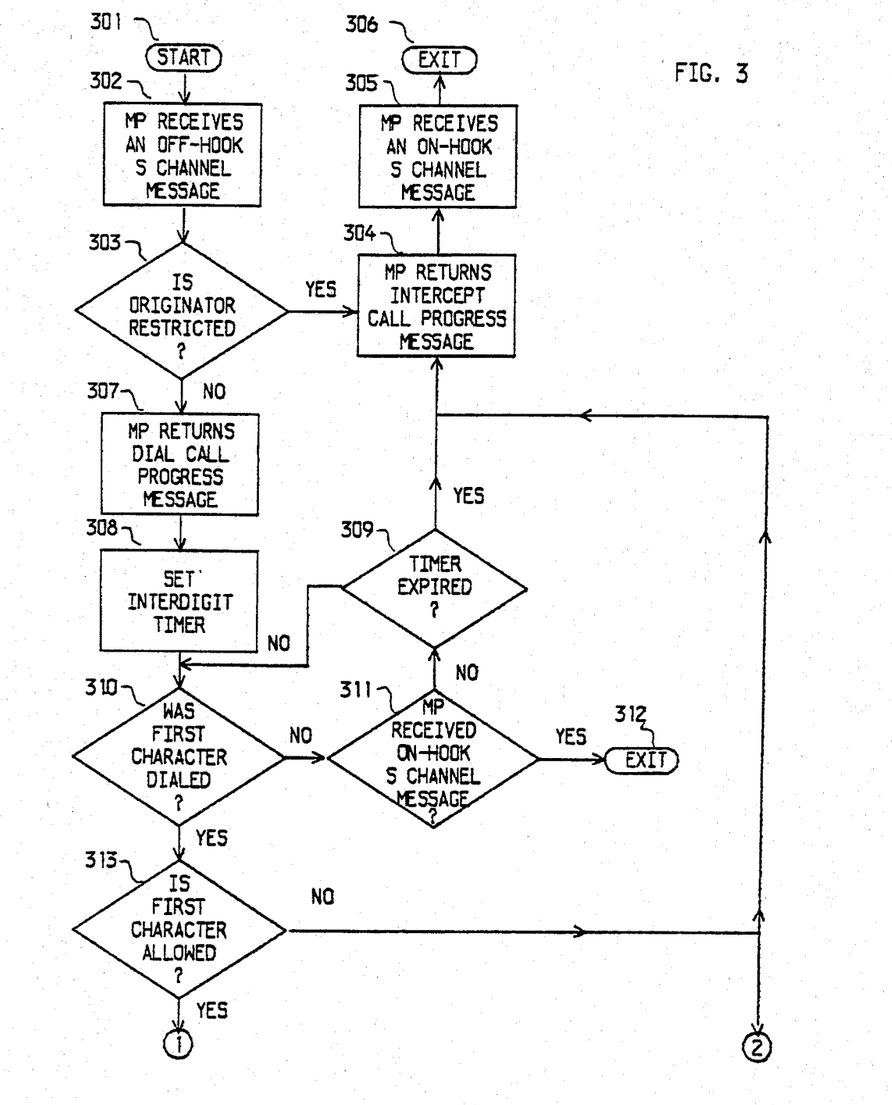
FIGS. 3-6 illustrate the method used to process a call "dialed" in ASCII from a digital terminal keyboard.

Assume that there is no digital terminal keyboard dialing restriction on digital terminal T11. System processor 100 advances to step 307 and returns the text message "DIAL" to digital terminal T11, which text message is displayed on the CRT screen of digital terminal T11. An interdigit timer (not shown), step 308, is set to limit the amount of time available to enter dialing characters in ASCII form. A software timing loop comprising elements 310, 311, and 309 is now activated to check for a control message from digital terminal T11 indicating either a character entered via the keyboard or an on-hook condition. If system processor 100 receives an on-hook control message from DTIM DT11 200 at step 311, call processing exits at step 312. If the interdigit timer expires at step 309 before a character is entered, call processing exits via steps 304 and 305 as described before.

Assume the user of digital terminal T11 enters an ASCII character before the interdigit timer times out. This ASCII character is transmitted from digital terminal T11 to EIA interface circuit 201 of DTIM DT11 200. Microprocessor 205 reads the dialed ASCII character out of EIA interface circuit 201 and writes same into I/O device 204. Digital line interface 203, as described above, reads out the contents of I/O device 204 one bit at a time and writes the first bit into the S field of a message segment which is transmitted to system processor 100 via the S channel. Through successive occurrences of this process, the first ASCII character is transmitted one bit at a time to system processor 100 via the S channel.

Figure 4:
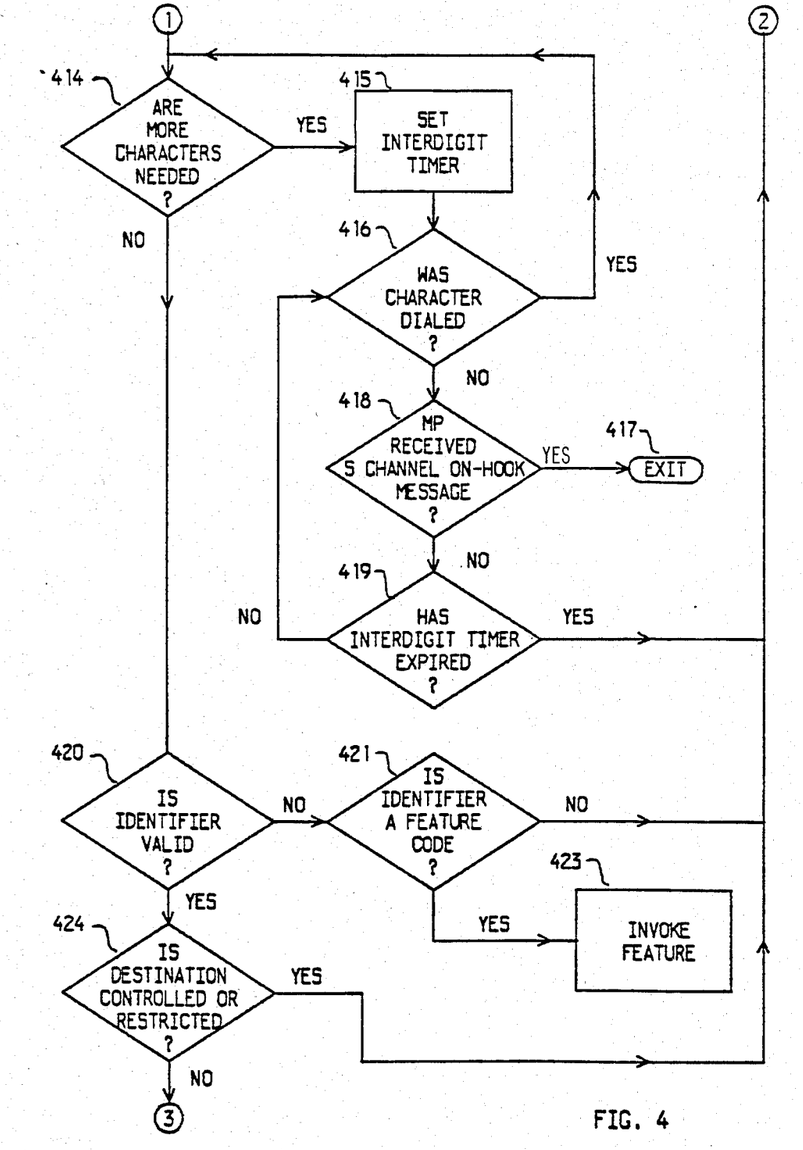

System processor 100 determines at step 313 whether the first dialed character is allowed. If not, call processing exits via step 304 as described before. The first dialed character is allowed in the example and system processor 100 proceeds to step 414. Assume that the rest of the characters are collected in a well-known fashion by the loop comprising elements 414, 415, and 416 until the complete dialed identifier has been collected. Again, the interdigit timer is set between dialed ASCII characters by step 415 and a monitoring loop (like loop 310, 311, and 309) is formed by elements 416, 418, and 419.

CONNECTION

When the dialing of the called party identifier is complete, system processor 100 exits step 414 to step 420, and the dialed identifier is tested against a predetermined set of identifier criteria to find if it is a valid station identifier. If system processor 100 determines that it is not, the dialed identifier is tested at step 421 to find if it is a feature code. If it is a feature code, the feature is invoked by process 423. If the dialed identifier is not a feature code and not a valid station identifier, call processing exits via step 304 as already described. But the dialed identifier in the example (the station number of data module T58) is a valid station code, so step 420 exits to step 424.

Figure 5:
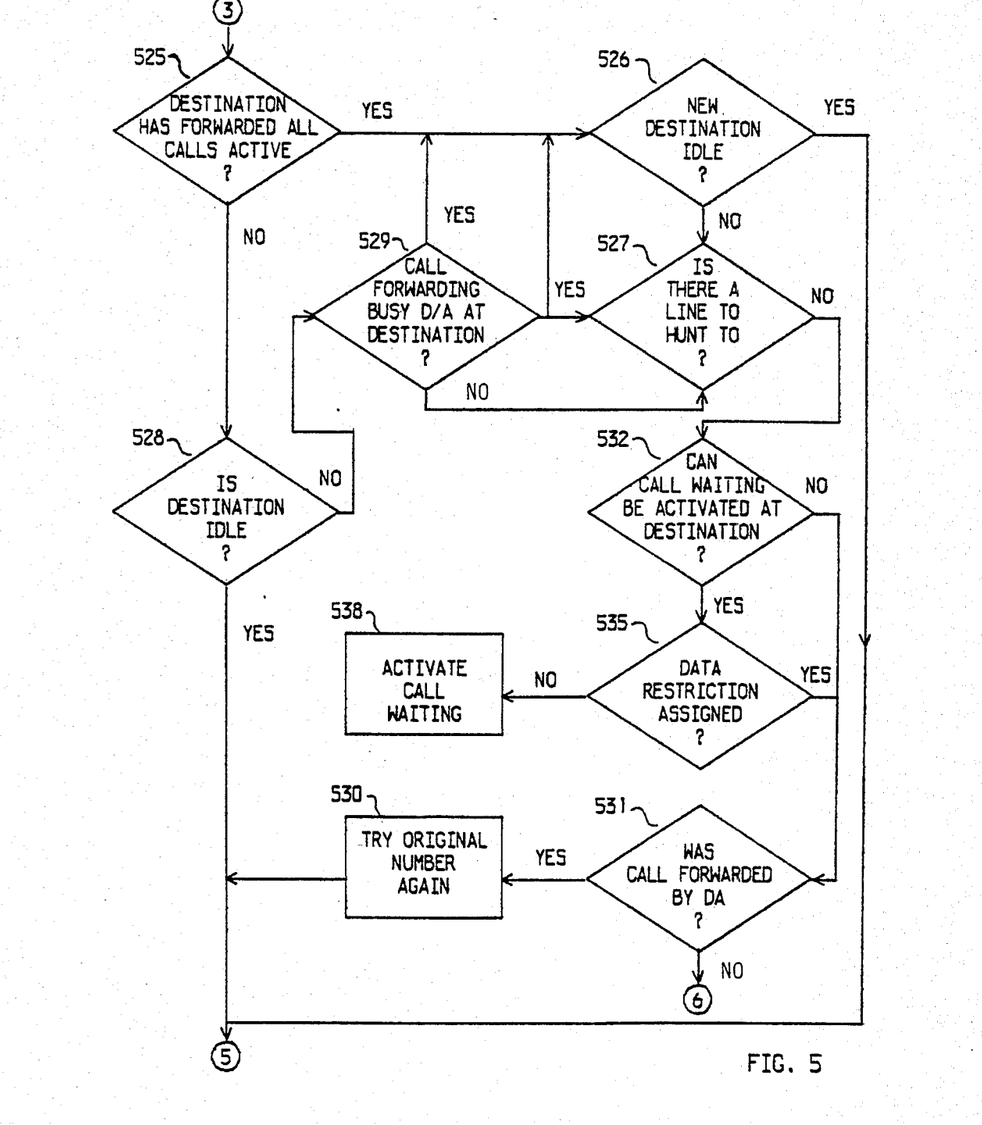

At step 424, system processor 100 evaluates the class of service assigned to destination data module T58. If destination data module T58 is restricted with respect to the originating digital terminal T11, step 424 directs system processor 100 to exit to step 304 as previously described. Since destination data module T58 is not restricted, call processing continues to step 525.

CALL REROUTING

Figure 6:
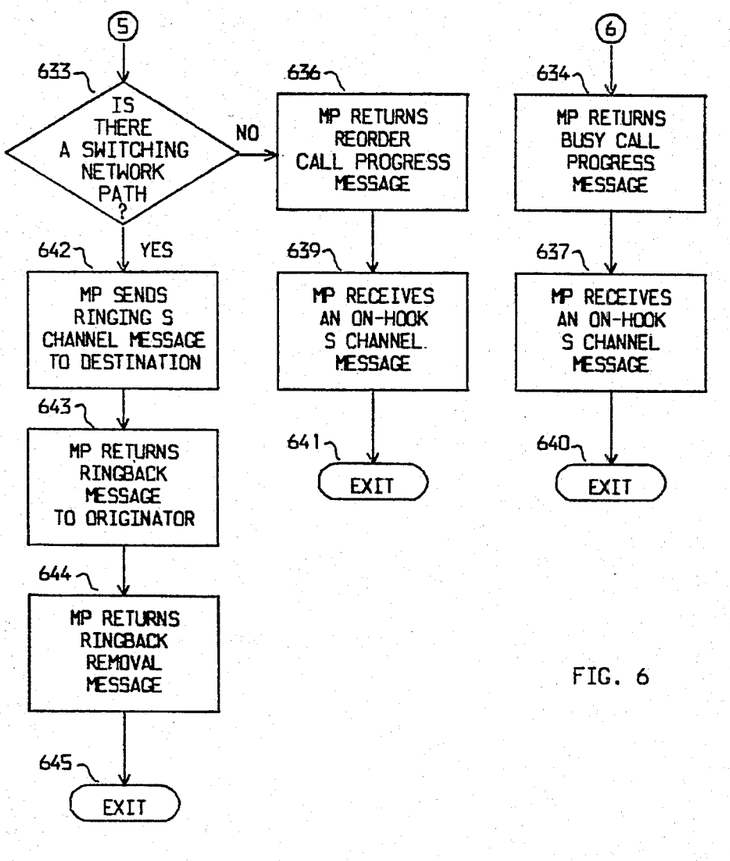

Between step 525 and exit 640 is a flow of several processes that have to do with the selection of alternate possibilities if destination data module T58 is not available. At step 525, system processor 100 checks destination data module T58 for call-forwarding status. If forward-all-calls is set at data module T58, the subject call must be forwarded to the next data module in the call-forwarding chain for data module T58. System processor 100 branches to step 526 where the next destination data module is tested to find if it is idle. If it is not idle, system processor 100 searches for a second alternate destination data module at step 527. If a second alternate destination data module has been appointed, it is tested at step 526 as before, and so on until there are no further destination data modules to hunt to. Lacking further destination data modules, there is only one possible way to connect to data module T58 to wait for it to become free. System processor 100 therefore exits step 527 to step 532 and tests destination data module T58 to see if call waiting is active. If call waiting is active, step 538 turns on a call waiting function. If call waiting is not active, step 531 determines whether call forwarding don't answer was the cause for forwarding the call. If not, system processor 100 advances to step 634 where system processor 100 returns a call progress control message of busy and a display message of "BUSY" to digital terminal T11. Digital terminal T11 displays the text message "BUSY" on the CRT screen and returns an on-hook control message to system processor 100 at step 637. System processor 100 exits call processing at step 640.

CALL COMPLETION

Assume that forward all calls is not active in the present example, so call processing continues from step 525 to step 528. At step 528, system processor 100 determines whether destination data module T58 is idle. Since the destination data module is idle in this example, system processor 100 tests switching network 101 at step 633 to determine if a switching network path is available to connect digital terminal T11 with data module T58. If there is no path available, system processor 100 branches to step 636 and returns a reorder call progress control message along with a display message of "TRY AGAIN" to digital terminal T11. The display message appears on the CRT screen of digital terminal T11 and DTIM DT11 200 returns an on-hook control message to system processor 100 (step 639), thus ending the call at step 641. Assume however that there is a switching network path available between digital terminal T11 and data module T58 so system processor 100 advances to step 642.

At steps 642 and 643 destination data module T58 is rung by port circuit 158 and a ringback signal is returned to digital terminal T11 along with the display message "RINGING" by system processor 100. Digital terminal T11 displays the text message on the CRT screen. The destination data module T58 automatically answers in the example, so ringback is removed and a calling party answer control message is transmitted by system processor 100 to DTIM DT11 200 via the S channel at step 644. DTIM DT11 200 receives the calling party answer control message and microprocessor 205 responds to this message by switching any subsequent ASCII data signals received from digital terminal T11 by EIA interface circuit 201 to data formatting circuit 202 rather than to I/O device 204. As discussed above, data formatting circuit 202 converts these subsequent ASCII data into eight bit data messages. Digital line interface 203 places these eight bit data messages into the I field of the message segment which is transmitted to switching network 101 via port circuit 111 and port/data control interface circuit 171. The switching network connection between digital terminal T11 and data module T58 is then complete as call processing exits at step 645.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a switching system which serves a plurality of communications circuits (T11-T58), each of which is connected by an associated port circuit (111-158) to a switching network (101) of said switching system, which switching network (101) establishes communications connections among said port circuits (111-158) under control of a system processor (100) and wherein one or more of said communications circuits (T11-T58) are digital terminals (T11), a digital terminal keyboard dialing arrangement comprising:

digital terminal interface means (200) associated on a one-to-one basis with said digital terminals (T11) for interconnecting said associated digital terminal (T11) with said switching network (101) via said associated port circuit (111);

control signalling means (S channel) connected to and interconnecting said digital terminal interface means (200) and said system processor (100) over a path exclusive of said switching network (101);

control means (205) in said digital terminal interface means (200) responsive to a predefined signal output by said associated digital terminal (T11) for transmitting a call origination signal to said system processor (100) via said control signalling means (S channel);

means (201, 203-205) in said digital terminal interface means (200) responsive to all keystroke signals output by said associated digital terminal (T11) following said predefined signal for routing said keystroke signals to said system processor (100) via said control signalling means (S channel); and means in said system processor (100) responsive to said keystroke signals representing a called party identifier for activating said switching network (101) to establish a network connection between the port circuits associated with said digital terminal (T11) and said called party.

2. The system of claim 1:

means in said system processor (100) responsive to said network connection for transmitting a call connection complete signal to said digital terminal interface means (200) via said control signalling means (S channel); and wherein said control means (205) is responsive to said call connection complete signal for applying said keystroke signals subsequently output by said associated digital terminal (T11) to said switching network (101) for transmission to said port circuit associated with said called party.

3. The system of claim 1 wherein said digital terminal interface means (200) includes:
EIA interface means (201) connected to said digital terminal (T11) and responsive to EIA signals output by said digital terminal (T11) for converting said EIA signals to bipolar modulated code signals; and
wherein said control means (205) is connected to said EIA interface means (201) and is responsive to a predefined one of said EIA signals received by said EIA interface means (201) for transmitting said call origination signal to said system processor (100) via said control signalling means (S channel).

4. The system of claims 1 or 3 wherein said control signalling means (S channel) includes:
means (TR11) connected to and interconnecting said digital terminal interface means (200) and said associated port circuit (111) for transmitting control signals between said digital terminal interface means (200) and said associated port circuit (111);
interface means (171) connected to a plurality of said port circuits (111-118) for multiplexing said control signals output by said plurality of port circuits (111-118); and
means (I/O BUS) connected to and interconnecting said interface means (171) and said system processor (100) for transmitting said multiplexed control signals between said interface means (171) and said system processor (100).

5. In a switching system which serves a plurality of communications circuits (T11-T58) each of which is connected by an associated port circuit (111-158) to a switching network (101) of said switching system, which switching network (101) establishes network connections among said port circuits (111-158) under control of a system processor (100), wherein one or more of said communications circuits (T11-T58) are digital terminals (T11) each of which is equipped with a digital terminal interface device (200) for interconnecting said digital terminal (T11) with said switching network (101) via said associated port circuit (111) and with said system processor (100) via a control signalling channel, a method of providing terminal dialing service comprising the steps of:
transmitting a call origination signal from said digital terminal interface device (200) to said system processor (100) via said control signalling channel in response to a predefined signal output by a calling one of said digital terminals (T11);
routing all keystroke signals output by said digital terminal (T11) following said predefined signal to said system processor (100) via said digital terminal interface device (200) and said control signalling channel;
establishing a network connection through said switching network (101) to the destination communication circuit identified by said keystroke signals output by said digital terminal (T11) to said system processor (100) via said control signalling channel; and
applying said keystroke signals subsequently output by said digital terminal (T11) from said digital terminal interface device (200) to said switching network (101) in response to the establishment of said network connection.

6. In a switching system which serves a plurality of communications circuits (T11-T58), each of which is connected by an associated port circuit (111-158) to a switching network (101) of said switching system, which switching network (101) establishes network connections among said port circuits (111-158) under control of a system processor (100) wherein one or more of said communications circuits (T11-T58) are digital terminals (T11) each of which is equipped with a digital terminal interface device (200) for interconnecting said digital terminal (T11) with said associated port circuit (111), a method of providing terminal dialing service comprising the steps of:
transmitting a call origination signal from a calling one of said digital terminal interface devices (200) to said system processor (100) over a signalling path exclusive of said switching network in response to a predefined signal from said digital terminal (T11);
routing all keytstroke signals output by said digital terminal (T11) following said predefined signal to said system processor (100) via said digital terminal interface device (200) and said signalling path to set up a path through said switching network (101) to a destination indicated by said keystroke signals;
returning a calling party answer control signal from said system processor (100) to said digital terminal interface device (200) via said signalling path when the destination answers to complete the network path; and
applying keystroke signals subsequently output by said digital terminal (T11) from said digital terminal interface device (200) to said switching network (101) in response to said calling party answer control signal.

7. In a switching system which serves a plurality of communications circuits (T11-T58), each of which is connected by an associated port circuit (111-158) to a switching network (101) of said switching system, which switching network (101) establishes network connections among said port circuits (111-158) under control of a system processor (100), a call origination method comprising the steps of:
monitoring said communications circuits (T11-T58) for a signal (BREAK) indicative of a call origination at any one of said communications circuits (T11);
transmitting ASCII keystroke signals representing the identification of a called communication circuit from said call originating communication circuit (T11) to said system processor (100) over a signalling path exclusive of said switching network; and
activating said switching network (101) in response to the reception of said ASCII keystroke signals to establish a network connection between said call originating communication circuit (T11) and said called communication circuit (T58).

8. The method of claim 7 including the step of:
applying said ASCII keystroke signals subsequently output by said call originating communication circuit (T11) to said switching network (101) in response to said network connection.

* * * * *